Figure 1:
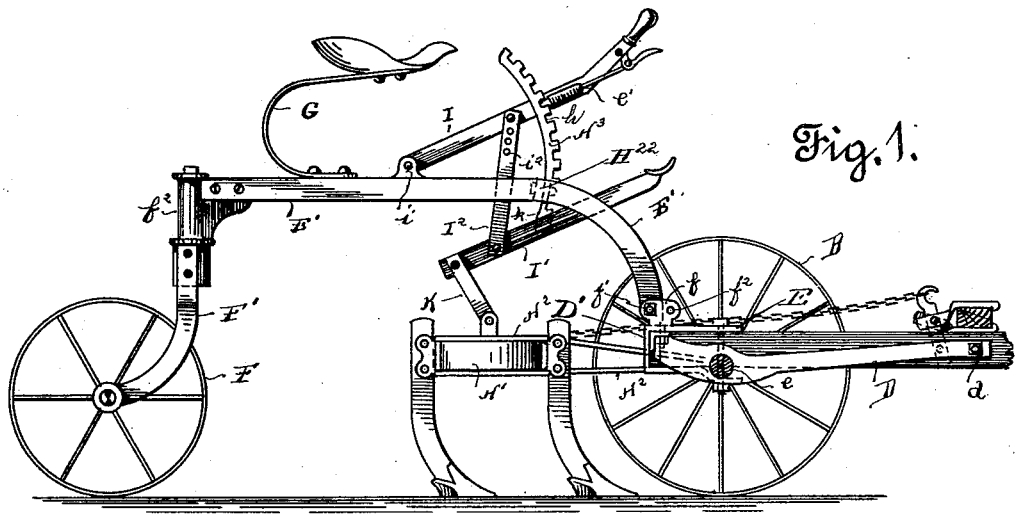

(No Model.)

D. E. BARTON.
WHEEL CULTIVATOR.

No. 484,513. Patented Oct. 18, 1892.

Witnesses.
H. Monteverde,
Chas. J. Armbruster.

Inventor.
Delbert E. Barton
By M. A. Acker
Atty

UNITED STATES PATENT OFFICE.

DELBERT E. BARTON, OF SAN FRANCISCO, CALIFORNIA.

WHEEL-CULTIVATOR.

SPECIFICATION forming part of Letters Patent No. 484,513, dated October 18, 1892.

Application filed December 2, 1891. Serial No. 413,777. (No model.)

*To all whom it may concern:*

Be it known that I, DELBERT E. BARTON, a citizen of the United States, residing at San Francisco, in the county of San Francisco and State of California, have invented certain new and useful Improvements in Wheel-Cultivators; and I do hereby declare the following to be a full, clear, and exact description of said invention, such as will enable others skilled in the art to which it most nearly appertains to make, use, and practice the same.

The present invention has relation to certain new and useful improvements in wheeled cultivators for use in orchards, &c., which consists in the arrangement of parts and details of construction, as will be hereinafter more fully set forth in the drawings and described and pointed out in the specification.

The object of my invention is, first, to so construct the frame of the cultivator and connection of the riding attachment thereto that the direct strain incident to the shovels contacting suddenly with large stumps, heavy roots, stones, &c., shall be taken off of the cultivator-axle, thus overcoming liability of breakage ensuing thereto; secondly, in providing for the easier and more direct lifting or lowering of the cultivator-shovel-carrying beam or frame, so as to allow for quicker movement thereof in case it becomes necessary to suddenly raise or lower same, and, third, to so connect the riding attachment or main frame to the supplemental frame as to allow for distributing the weight of the driver for the purpose of taking the strain of the draft-tongue from off the horse's neck.

Figure 2:
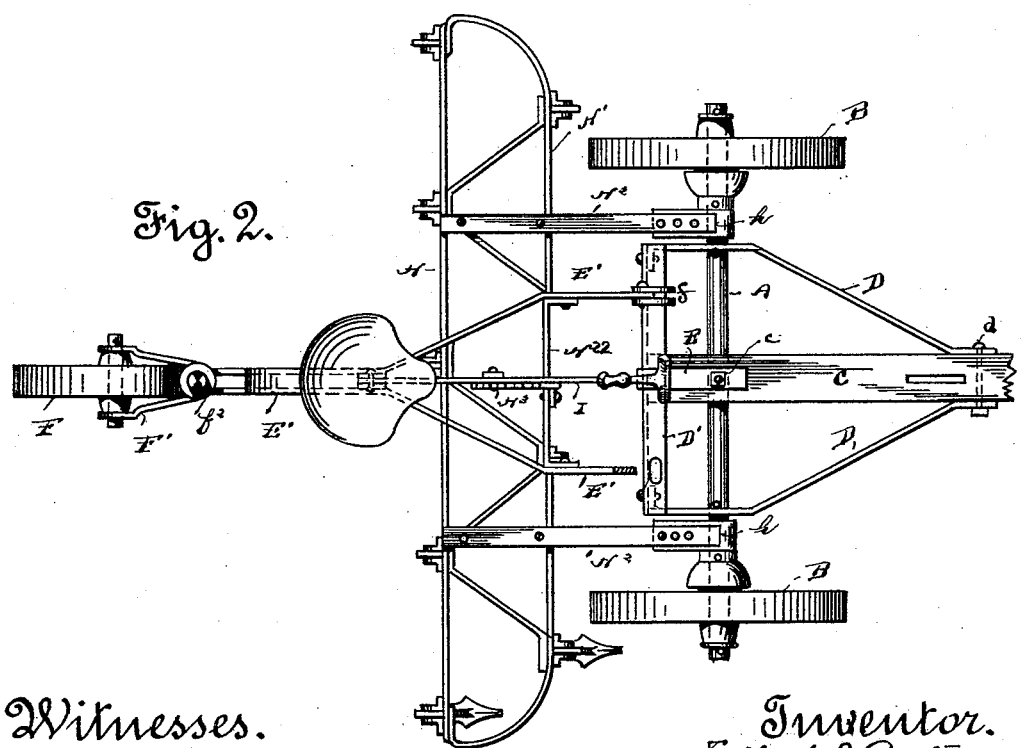

Referring to the drawings forming a part of this specification, in which similar letters of reference denote corresponding parts throughout the entire specification and several views, Figure 1 is a side view in elevation of the entire machine, and Fig. 2 a top view thereof.

The letter A is used to indicate the front horizontal axle of the cultivator, which is sustained at its outer ends by means of ground-wheels B, as fully shown.

The tongue or draft-pole C of the cultivator is held in place upon the axle through the medium of bolt $c$ and supplemental frame, which consists of brace-pieces D D, secured at one end to the draft-pole by bolt $d$ and cross-connecting plate D', which is secured to the draft-pole by strap E, fastened above and below the axle A. The brace-pieces D D are provided with openings $e$, through which the ends of the horizontal axle pass, thus allowing said braces to move more freely thereon, while the rear ends thereof project to the rear of the axle, which, being united, as above stated, by connecting plate or bar D', throws the main portion of the supplemental frame to the rear of the axle.

The main frame of the cultivator consists of the pieces E' E', which at their forward ends are movably secured to the rear connecting plate or bar D' of the supplemental frame by means of the upwardly-projecting ears $f$ and bolts $f'$. Consequently, as the curved pieces or braces E' are lifted upward at their rear ends they turn at their forward end upon bolts $f'$. Thus, it will be observed, that the curved pieces are movably coupled to the supplemental frame at their forward end, while by reference to Fig. 2 it will be seen that they converge thence toward the rear and are bolted to an intermediate socket $f^2$. The rear end of the main frame, which constitutes the riding attachment, is supported by a ground or guide wheel F, mounted in a fork or bracket F', which is provided with a vertical journal seated in socket $f^2$. The rear wheel, being free to turn in any direction, in the ordinary manner, permits of the entire machine being moved at will in any direction under guidance of the draft-pole. As shown in Fig. 1, the main frame or riding attachment pieces E' E' are bent upward or arched between their front and rear ends, and thus are enabled to give support to spring G, to which the driver's seat is secured.

The shovel-carrying standard-beam is composed of pieces H H', suitably united, and which is located between the ground-wheel and swivel-wheel and to the rear of the supplemental frame. This beam is held in position by means of drag-bars H², which are connected to the horizontal axle A through the medium of straps $h$. (Clearly shown in Fig. 2.) The shovel-carrying standard-beam is suspended beneath the main frame by means of the raising or lowering mechanism, which will be fully described.

Between the curved or bent pieces or braces E' E' of the main frame is secured brace H², to which is fastened the lever-quadrant H³, within the teeth $h$ of which engages spring-catch $e'$ of hand-lever I. This lever is pivoted to projecting ear $i'$, secured to curved braces E' E', and is connected to foot-lever I' by means of the link-strap I², which is provided with openings $i^2$, so as to permit shortening or lengthening of distance between the levers, which are so situated as to be within easy reach of the driver's hand or foot. The foot-lever I' is fulcrumed to downwardly-extending projection $k$, and has its rear end connected to the shovel-carrying standard-beam by means of link-strap K, which is pivoted thereto. In order to raise said beam and shovels carried thereby, the operator presses downward upon foot-lever I, which throws the rear end upward and partially lifts the frame, which is wholly raised by upward lifting of the hand-lever I, all fully set forth in Fig. 1. By this mechanism less power is required by the operator than if raised entirely through the medium of the hand-lever, inasmuch as the power therefor is distributed between the operator's arm and leg.

Should the shovels during the cultivator's line of movement engage, pass beneath, or penetrate heavy roots, stumps, &c., the tendency is to throw downward the shovel-carrying beam, which, being rigidly locked to the main frame or riding attachment, exerts a downward strain thereon, which, should the same be connected directly to the horizontal axle, would be liable to become broken by such strain or break the axle; but inasmuch as the same is secured to the movable supplemental frame to the rear of the center, which is connected to the draft-tongue, it is obvious that such downward strain is thrown upon said supplemental frame, which is moved at its rear end downward, and such movement necessarily throws the draft-tongue upward, consequently releasing the shovel-carrying beam from undue strain thereof and takes off the sudden jar of the cultivator otherwise resulting to the team.

It will be noticed by reference to Fig. 1 that ears or projections $f$ are provided with openings which permit of forward or backward adjustment of the riding attachment or main frame E' E', in order to regulate the weight of the driver upon the supplemental frame, so as to balance the draft-tongue for the purpose of taking the strain of the weight thereof and whiffletrees off the horse's neck, inasmuch as said tongue is held by the supplemental frame.

Having thus described my invention, what I claim as new, and desire to secure protection in by Letters Patent of the United States, is—

1. In a cultivator, the combination, with the supplemental frame, of the main frame connected thereto, swiveling wheel sustaining rear end of main frame, shovel-carrying beam extending transversely between the supplemental frame and swivel-wheel, and mechanism for raising and lowering the shovel-carrying beam at will, as and for the purpose set forth.

2. In a cultivator, the combination, with the front horizontal axle mounted upon ground-wheels, supplemental frame movably secured thereto, main frame movably connected to rear portion of said frame, swivel-wheel for sustaining the rear end of the main frame, shovel-carrying beam suspended between the supplemental beam frame and swivel-wheel, drag-bars carrying the transverse beam at their rear end and secured to the horizontal axle at their forward end, hand and foot levers, and locking device mounted in the main frame within reach of the driver and connected with the shovel-carrying beam in order to raise or lower same, as and for the purpose set forth.

3. In a cultivator, the combination, with the main frame, of the supplemental frame to which the former is movably secured, swiveled wheel for sustaining rear end of main frame, shovel-carrying beam suspended between supplemental frame and swivel-wheel, driver's seat secured to the main frame, lever-quadrant held between arched braces of the main frame, hand-lever movably secured to said frame and adapted to lock within the quadrant, foot-lever fulcrumed beneath the frame and connected to the hand-lever by an adjustable link-rod, and the link connection between rear end of the foot-lever and shovel-carrying beam, said beam adapted to be raised or lowered by the upward or downward movement of the hand and foot lever, each of which is within reach of the operator's hand and foot, as and for the purpose set forth.

4. In a cultivator, the combination, with the supplemental frame movably secured to the axle, of the riding attachment or main frame adjustably secured to the supplemental frame in order to allow for forward or backward adjustment of the same for the purpose of regulating distribution of the operator's weight, as and for the purpose set forth.

In testimony whereof I affix my signature in presence of two witnesses.

DELBERT E. BARTON.

Witnesses:
  GEO. T. KNOX,
  H. J. LANG.